Nov. 24, 1931.    W. F. STIMPSON    1,833,186
BEARING FOR FOOD GRINDER SHAFTS
Filed Nov. 18, 1927    2 Sheets-Sheet 1
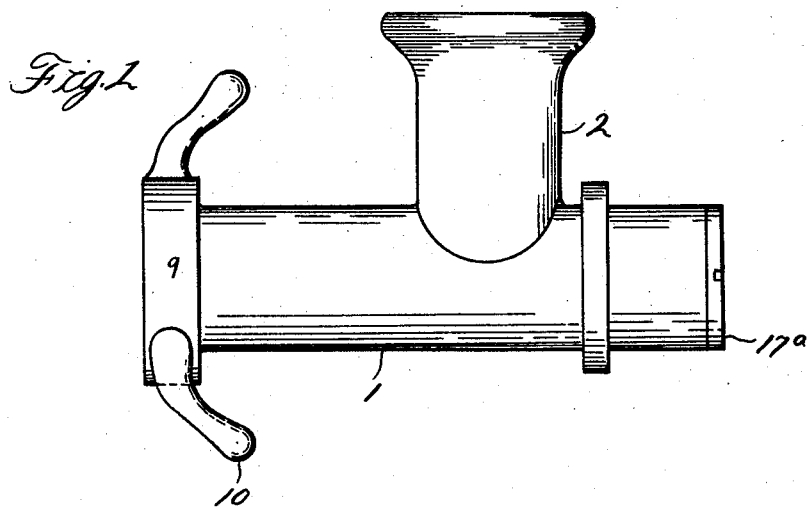
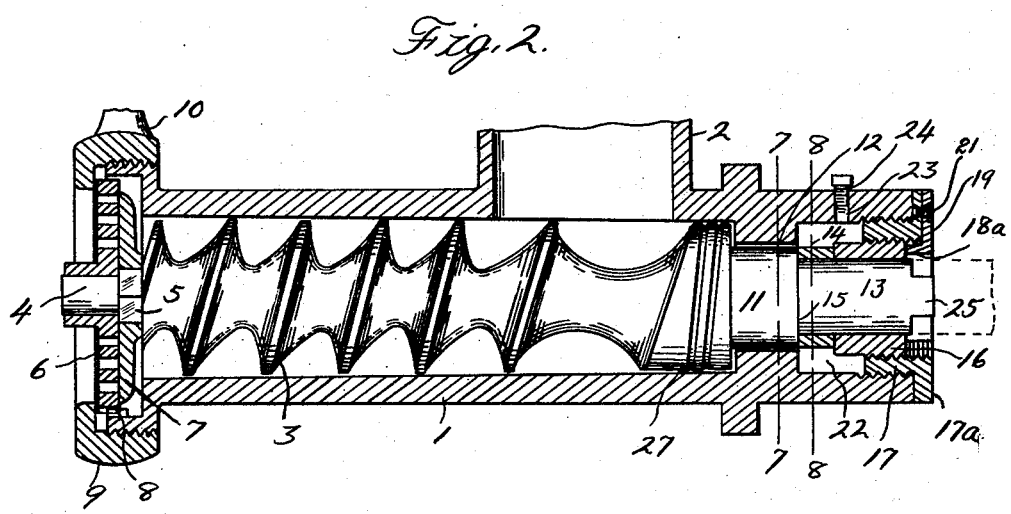
Inventor
Walter F. Stimpson Nov. 24, 1931.  W. F. STIMPSON  1,833,186
BEARING FOR FOOD GRINDER SHAFTS
Filed Nov. 18, 1927  2 Sheets-Sheet 2
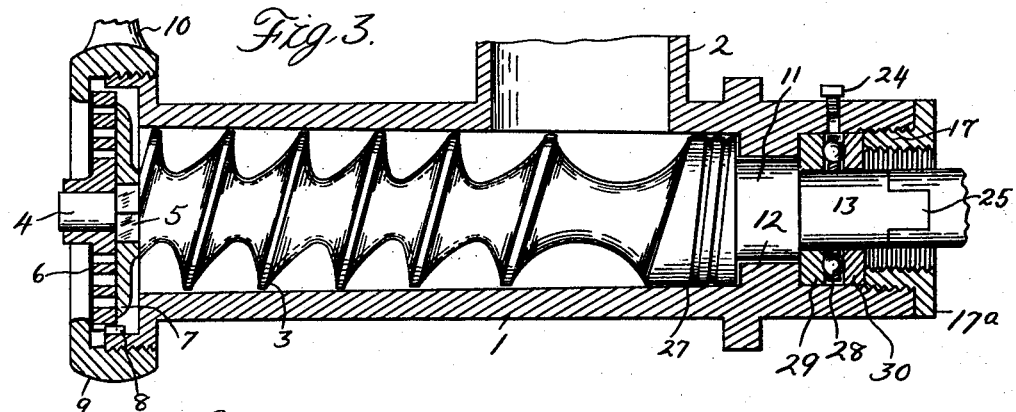
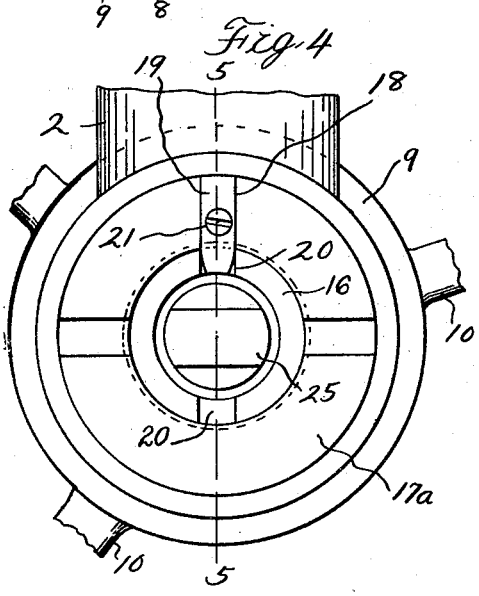
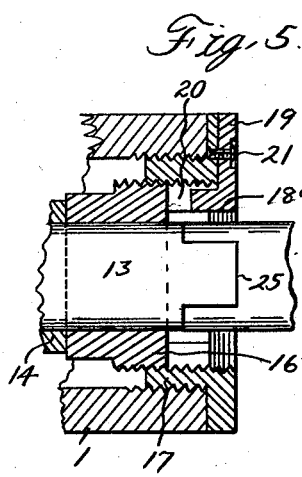
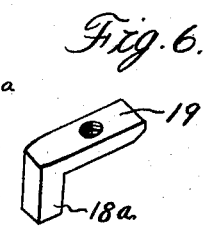
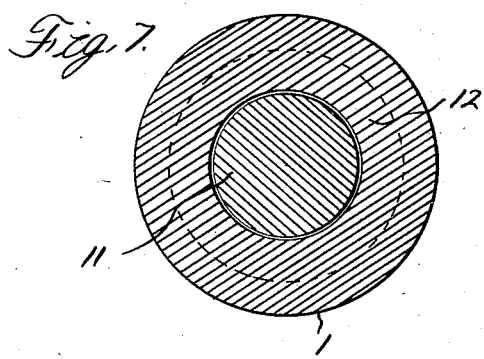
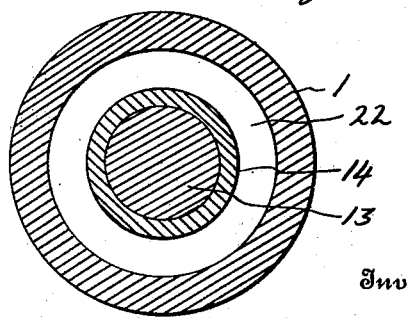
Inventor
Walter F. Stimpson
By Swan, Fryer, & Murray
Attorneys Patented Nov. 24, 1931

1,833,186

UNITED STATES PATENT OFFICE

WALTER F. STIMPSON, OF LOUISVILLE, KENTUCKY

BEARING FOR FOOD GRINDER SHAFTS

Application filed November 18, 1927. Serial No. 234,117.

This invention relates to food grinding machines and particularly to bearings for the shafts of such machines.

It is usual in food grinding machines to provide a spiral worm for advancing food to the cutter members, and the reaction of the food against this worm occasions a considerable rearward axial thrust. It is an object of the present invention to provide a simple mechanism for relieving this axial thrust either by bushings or by ball bearings, and to provide a simple adjustment means affording the necessary compensation for wear when bushings are employed.

Another object of this invention is the arrangement of the worm shaft and casing whereby the bearings will be protected from vagrant meat juices, etc., likely to cause rapid deterioration of the bearings, while permitting ready substitution of new bearings should such substitution become necessary or desirable.

These and various other objects the invention attains by the construction hereinafter described and illustrated in the accompanying drawings, wherein Figure 1 is a view in side elevation of a food grinder to which my invention is applied.

Figure 2 is a vertical longitudinal section view of said food grinder with the upper portion thereof broken away.

Figure 3 is a similar view disclosing the use of an alternative type of thrust bearing from that illustrated in Figure 2.

Figure 4 is a rear end view of the improved grinder.

Figure 5 is a vertical sectional view taken upon the line 5—5 of Figure 4 and primarily disclosing an adjustment means for a thrust bearing bushing.

Figure 6 is a perspective view of a locking element forming part of the mechanism of Figure 5.

Figure 7 is a cross sectional view taken upon the line 7—7 of Figure 2.

Figure 8 is a cross sectional view taken upon the line 8—8 of Figure 2.

In these views the reference character 1 designates the cylindrical feed barrel of a grinding machine and 2 a food supply hopper integrally rising from said barrel intermediately of the length thereof. Fitting within the barrel 1 is a spiral worm 3, the forward end of which carries a trunnion 4 between which and the worm 3 there is formed a rectangular seat 5. A cutter member 7, detachably fitting over the seat 5, rotates with the worm and coacts with a non-rotative cutter plate 6, perforated for the discharge of ground food and restrained from rotation by its peripheral engagement by a key member 8 carried by the barrel 1. The cutter member 6 is formed with a central bearing journaling the trunnion 4, and is held in proper contact with the rotary cutter member 7, and in proper axial relation to the barrel by a collar 9 threaded upon the forward end of said barrel. Said collar is preferably formed with a plurality of outwardly projecting arms 10 for manually effecting its rotation.

From the rear end of the worm projects a shaft 11 which snugly engages in the opening formed by an annulus 12 formed interiorly of the barrel 1 between the hopper 2 and the rear end of said barrel. Rearwardly of said annulus, the shaft 11 has a reduced portion 13 upon which in the modification shown in Figures 2, 4 and 5, is freely mounted a ring 14, preferably of phosphor bronze, bearing against the shoulder 15 formed at the juncture of the shaft portions 11 and 13. The ring 14 also engages a thrust bushing 16, also of phosphor bronze, threaded into a collar 17, which is in turn threaded in the rear end of the barrel 1, and is outwardly flanged as indicated at 17ª. The rear face of the collar 17 is formed with a radial channel 18 in which is adapted to fit a key member 19 having its inner end bent forwardly as indicated at 18ª for engagement in any one of several radial notches 20 formed in the rear end of the bushing 16. The key member 19 is adapted to be secured in the groove 18 by a screw 21.

To provide for the introduction of a lubricant into the chamber 22 in which the bushings 14 and 16 are disposed, an opening 23 is formed in the top portion of the rear end of the barrel 1 and is normally closed by a screw plug 24 or the like. Upon the rear end of the worm shaft 11, 13 is formed a transverse rib 25 engageable by any suitable member for communicating a drive to the worm.

Considering now more fully the utility of the described construction, it is to be understood that the engagement of the shaft portion 11 in the annulus 12 of the barrel is not for the purpose of providing a rear bearing for the worm but rather to establish such a seal as will tend to prevent any forward flow of lubricant from the chamber 22 such as would permit any portion of the lubricant to contaminate food advancing through the barrel. The relation of the parts 11 and 12 further is an advantage in preventing any rearward passage from the food chamber of the barrel of food particles or juices which, if allowed to enter the thrust bearing portion of the barrel, would tend to corrode the thrust bearing members. Any rearward passage of food particles or juices is furthermore prohibited by forming adjacent the rear end portion of the main worm 3 a secondary worm groove 27, tending to continuously feed any juices or particles forwardly, i. e., away from the annulus 12.

From time to time the wear between the engaging faces of the ring 14 and bushing 16 will necessitate an adjustment to take up lost motion, and such adjustment may be quickly effected by loosening the screw 21, removing the locking key 19 and rotating the bushing 16 by engagement of any suitable tool with one or more of the notches 20, to advance said bushing and the ring 14 sufficiently to take up lost motion. This being accomplished the key member 19 is again secured in its position of use, with its inner end engaging any convenient one of the notches 20 to lock the bushing 16 against any rotative shifting. It is to be noted that the bushing 16 functions both as a thrust bearing member and as a journal bearing member maintaining the rear end portion of the worm properly centered within the barrel. Also the forwardly projecting portion 18a of the key 19 will continue to lock the bushing 16 even after it has been advanced a considerable number of revolutions.

In some installations of the described food grinder, it will be preferred to provide at the rear end of the worm a ball type of thrust bearing, and under such conditions the arrangement of parts shown in Figure 3 may be employed. That is to say in place of the collar 14 and bushing 16 a set of ball members 28 are engaged between a pair of ball race members 29 and 30 rearwardly of the annulus 12 and the collar 17 now serves to hold said ball race members and ball members in proper co-action and against the shouldered rear extremity of the shaft portion 11. Also the race members 29 and 30 may be forced forwardly to compensate for wear by rotation of the collar 17, or the worm shaft may be forced rearwardly by rotation of the front adjustment ring 9 for the same purpose.

Thus it will be seen that the same shaft and casing construction is adapted to be fitted with either of two different types of thrust bearings, by the ready substitution of a few simple parts.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

What I claim is:

1. A food grinder comprising a barrel intermediately formed with a food delivery opening and having a food outlet at its forward end, food cutting means carried by the forward end of said barrel, a feed worm rotatable in said barrel for advancing food to said cutting means from said inlet, said worm carrying a shaft at its rear end formed with an annular shoulder, a ring embracing said shaft and having a thrust bearing engagement with said shoulder, an externally and internally threaded collar externally engaging and extending within the rear end portion of said barrel, a bushing screw-threaded in the internal threads of said collar embracing said shaft and having a thrust bearing engagement with said ring, and means carried by said collar for holding said bushing in selective positions of longitudinal and rotative adjustment.

2. A food grinder comprising a barrel having an intermediate food delivery opening and having at its forward end a food outlet, food cutting means carried by the forward end of said barrel, a worm rotatable in said barrel for advancing food to said cutting means from said food outlet, said worm having a shaft at its rear end formed with an annular shoulder, an annulus rigidly interiorly carried by said barrel, and embracing said shaft and forming a seal against the rearward passage of food, a ring embracing said shaft rearwardly of said annulus and having a thrust engagement with said shoulder, a collar adjustably carried by the rear end of the barrel, a bushing adjustably mounted in said collar embracing said shaft and having thrust engagement with said ring and adjustable axially of the barrel to take up wear, and means removably carried by said collar and arranged to engage the bushing for holding said bushing variously adjusted.

3. A food grinder comprising a barrel having an intermediate food inlet and an outlet at its forward end, cutting means carried by said barrel at its forward end, a worm rotatable in said barrel for advancing food to said cutting means from said inlet, said worm having a shaft at its rear end, an externally and internally threaded collar externally threaded within the rear end of said barrel and formed with a radial slot in its rear face, a bushing journaling said shaft and screw-threaded in the internal threads of said collar, for relative longitudinal adjustment to compensate for wear resulting from the rearward thrust of the worm, said bushing having a notch in its rear end, and a key member fitting in the radial groove of said collar having its inner end portion elongated to engage in the notch of said bushing to lock the bushing against rotation in various adjusted positions.

In witness whereof I hereunto set my hand.

WALTER F. STIMPSON.